(12) United States Patent
Berger

(10) Patent No.: US 6,985,725 B2
(45) Date of Patent: Jan. 10, 2006

(54) METHOD AND APPARATUS FOR MAINTAINING INDEPENDENT, PARALLEL DATA STREAMS OVER SEPARATE MODULATION CHANNELS OF A MULTI-DIMENSIONAL MODULATOR

(75) Inventor: Harvey L. Berger, Redondo Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 905 days.

(21) Appl. No.: 09/918,855

(22) Filed: Jul. 31, 2001

(65) Prior Publication Data

US 2003/0027568 A1 Feb. 6, 2003

(51) Int. Cl.
*H04Q 7/20* (2006.01)
(52) U.S. Cl. ................................ 455/429; 455/13.4
(58) Field of Classification Search ............... 370/316, 370/335; 455/429, 13.4
See application file for complete search history.

(56) References Cited

U.S. PATENT DOCUMENTS 6,005,855 A * 12/1999 Zehavi et al. ............... 370/335
6,320,850 B1 * 11/2001 Perahia et al. .............. 370/316

\* cited by examiner

*Primary Examiner*—Ahmad F. Matar
*Assistant Examiner*—Quynh H. Nguyen
(74) *Attorney, Agent, or Firm*—Noel F. Heal

(57) ABSTRACT

A method and apparatus are provided for supporting the transmission of communications data in a satellite communications network 10 between user terminals 15–18 and a ground station 14 via a satellite 12. At least one carrier signal is generated in a beam spot and conveys communications data over at least one downlink 22–25 to the user terminals 15–18. The carrier signal is modulated simultaneously with independent communications data streams EDP15 and EDP 18 over modulation channels 802 and 804, respectively, of a multi-dimensional modulator 400. By passing independent data streams over each dimension of an n-dimension modulation technique, different encoding schemes may be assigned to user terminals 15–18 based upon the strength of the signal received by the user terminal 15–18.

18 Claims, 5 Drawing Sheets

METHOD AND APPARATUS FOR MAINTAINING INDEPENDENT, PARALLEL DATA STREAMS OVER SEPARATE MODULATION CHANNELS OF A MULTI-DIMENSIONAL MODULATOR

BACKGROUND OF THE INVENTION

The present invention generally relates to a satellite communications network and more specifically to a satellite communications network that supports parallel, independent communications links with separate terminals over separate modulation channels of a multi-dimensional modulator.

Satellite communication systems have been proposed for relaying communications signals between one or more terminals and a ground station or earth station. The terminals (mobile or fixed) may be located at various locations about the world with multiple terminals located in a common field of view of one satellite. Quite often, a single beam spot may have several hundred users located therein. The satellite typically includes one or more antenna arrays that define beam spots or footprints on the earth's surface. Each beam spot defines a coverage area which may be several hundred miles in diameter. Terminals in the coverage area of a beam spot communicate with the satellite over predetermined uplink and downlink frequency spectra associated with the beam spot. Ground stations communicate with the satellite over predetermined feeder uplink and downlink frequency spectra.

Satellite systems have been proposed that utilize different types of access schemes to maximize the number of users that may communicate with a satellite while in a single beam spot's coverage area. For instance, access schemes that have been proposed include time division multiple access (TDMA), frequency division multiple access (FDMA), code division multiple access (CDMA) and the like. Optionally, multiple carrier frequencies may be used within a single beam in a hybrid TDMA and FDMA type system.

In a system supporting a TDMA format, the satellite supports a beam having at least one carrier frequency received by all user terminals in the beam's coverage area that are assigned to the carrier frequency. The carrier frequency is temporally divided into a sequence of consecutive, adjacent time slots. Each time slot holds cells or packets of communications data designated for a particular user terminal. The time slots are organized into master frames. Each given master frame comprises a predetermined number of time slots, during which data packets intended for a particular user terminal are modulated onto the carrier frequency. Each data packet includes addressing information identifying the destination user terminal. All user terminals in a single beam's coverage area and assigned to a common carrier frequency receive all data transmitted over that carrier frequency. Each user terminal then identifies the data packets designated for the corresponding user terminal based upon the addressing information therein.

Communications satellites typically receive communications data streams over separate terminal uplinks and combine, in the satellite, the data into a common feeder downlink designated for a corresponding ground station. The composite signal transmitted to the ground station is conveyed over a feeder downlink. In a feeder uplink, a ground station transmits data cells arranged according to a TDMA format. The data cells in the feeder uplink are modulated upon a feeder uplink carrier frequency. Exemplary modulation techniques include quadrature phase shift keying (QPSK), 8 phase shift keying (8PSK), 16 quadrature amplitude modulation (16-QAM), 32-QAM modulating, and the like.

The satellite may merely represent a "bent-pipe" type satellite, in which the data received over the feeder uplink is simply translated in frequency and transmitted over one or more corresponding beams. Bent pipe satellites offer limited on-board processing. Alternatively, the satellite may be more intelligent than a bent-pipe type satellite. For instance, the satellite may perform on-board processing including, inter alia, decoding data, redirecting data to one of multiple destinations, directly interconnecting source and destination terminals and the like.

A feeder uplink may further be divided into multiple frequency subbands, each frequency subband of which is uniquely associated in a one-to-one relation with a beam defined by the satellite's antenna array. An exemplary bent-pipe type satellite may merely translate the carrier frequency associated with a particular frequency subband to a carrier frequency assigned to a corresponding beam. The satellite may then transmit all of the received data modulated over the carrier frequency of the beam associated with the frequency subband of the feeder uplink. The return communications link from a user terminal to a ground station is established in a similar manner by modulating communications data over a carrier frequency assigned to the terminal-to-satellite uplink and then frequency translated by the satellite and relayed over a corresponding frequency subband in a feeder downlink.

The communications links established between user terminals and satellites vary substantially in quality. Signal quality is dependent in part upon signal strength. Signal strength varies depending upon the geographic position at which a user terminal is located. Signal strength also varies depending upon the user terminal's relative position within the coverage area of a particular beam spot. The signal characteristics associated with a particular beam spot are experienced unevenly across the beam spot. Typically, greater signal strength is experienced at the center of a beam spot, while weaker signal strength is experienced at the outer edges of a beam spot. Hence, terminals located at the outer edge of a coverage area of a beam spot may experience a weaker communications link with the satellite in both the uplink and downlink, as compared to the link maintained between a satellite and a user terminal located at the center of the coverage area. In addition, terminals located in geographic regions of the world that experience a substantial amount of cloud cover or rainfall may experience a weaker connection with the satellite than user terminals located in areas with a clear sky.

Satellite systems have been proposed that attempt to address the problems experienced by weak signal strength. For example, systems have been proposed for encoding the communications data with an error correction code. The error correction code enables the terminal and ground station to identify errors within the communications data stream and either correct each error or retransmit the data. Exemplary encoder techniques include convolutional encoders, block encoders and the like.

Each terminal and ground station includes a modulator for placing the data on the carrier frequency. An exemplary modulator is a QPSK modulator. A QPSK modulator includes two modulation channels, namely an I channel and Q channel. A QPSK modulator represents a two-dimensional modulator as it includes two modulation channels. An 8PSK modulator includes three modulation channels and represents a three-dimensional modulator. Similarly, a 16-QAM modulator includes four channels and thus represents a four-dimensional modulator, while a 32-QAM modulator includes five modulation channels and represents a five-dimensional modulator.

User terminals and ground stations have been proposed which use QPSK modulators having a first encoder connected to the I channel and a second encoder connected to the Q channel. A single communications data stream to/from one terminal is divided between the first and second encoders such as through multiplexing by which alternate bits of the single data stream are alternately provided to the first and second encoders. The first and second encoders then encode corresponding portions of the single data stream at a common error correction coding rate and provide the encoded partial data streams to the QPSK modulator. The QPSK modulator then modulates upon the carrier frequency half of the encoded data stream on the I channel and half of the encoded data stream on the Q channel.

The demodulator at the receiving terminal or ground station demodulates the I channel half of the encoded data stream and the Q channel the other half of the encoded data stream. Corresponding decoders are attached to the I and Q channel outputs of the demodulator and decode corresponding halves of the data stream. The partial data streams output from the first and second decoders are then recombined in an alternating manner to form a single data stream. The foregoing structure is repeated in the forward communications link from the ground station to the terminal and reverse communications link from the terminal to the ground station.

Optionally, a single encoder may be used, with the encoded data stream output from the encoder being evenly divided between the I channel and Q channel of the modulator. Further, a single decoder may be used, whereby the I and Q channel outputs from the demodulator are first combined by multiplexing and then passed through the single demodulator.

However, proposed systems have certain drawbacks. First, proposed systems require each user terminal to demodulate and process (e.g., encode and decode) both the partial (half) data streams carried over the I and Q channels in order to form each data packet from a received signal. Requiring each user terminal to incorporate both I and Q channel data processing hardware and software increases the cost and complexity of each user terminal. A second disadvantage of proposed systems is that all user terminals in a given beam spot that are assigned to a common carrier frequency must implement a common amount of error correction encoding/decoding in order to encode/decode data packets addressed thereto and transmitted therefrom. The encoding scheme designated for a given carrier frequency, in proposed systems, is designed based on the "worst case scenario", in which the weakest signal strength is estimated for the entire beam spot. For instance, a system may be designed based on the assumption that a user at the outer edge of a beam spot requires a one-half encoder rate; that is for every bit of data provided to the encoder, two encoded bits are generated for modulation and transmission. Hence, a system requiring a 200 Megabit per second information data rate would require a 400 Megabit per second transmission data rate to account for the encoded data.

However, while users at the edge of a beam spot may require a one-half encoder rate to afford sufficient error correction to account for signal weakness, users at the center of the same beam spot experience a much stronger signal and therefore require significantly less encoding, such as a two-thirds or three-fourths encoder rate. Conventional systems require a common amount of encoding for all users assigned to a common carrier frequency. Accordingly, a system designed to afford a one-half encoder rate for users at the edge of a beam spot unnecessarily requires users at the center of the beam spot to use a one-half encoder rate, thereby mandating unneeded error correction encoding and decoding. Requiring excessive error correction decoding unnecessarily wastes system bandwidth and unduly limits the information data rate that may be afforded to users at the center of the beam spot and users having strong signal connections with the satellite.

A need remains for an improved communications satellite system. It is an object of the present invention to meet this need.

BRIEF SUMMARY OF THE INVENTION

A method according to a preferred embodiment of the present invention is provided for providing communications data, in a satellite communications network, between a user terminal and a ground station via a satellite. According to the method, at least one carrier frequency is generated in a beam spot covering multiple user terminals. The carrier frequency conveys modulated communications data streams over downlinks to user terminals. A single carrier frequency is simultaneously and in parallel modulated with first and second independent communications data streams over first and second modulation channels, respectively, of a multi-dimensional modulation technique.

The first communications data stream may be assigned to a first terminal located near an edge of the beam spot. The second communications data stream may be assigned to a second terminal located near a center of the beam spot. The terminals may be assigned to different modulation channels based on the signal strengths of downlinks to the terminals.

According to an alternative embodiment of the present invention, the communications data streams may be encoded based upon different encoding rates before modulated simultaneously and in parallel over the modulation channels of the multi-dimensional modulation technique. By way of example only, the first and second data streams may be simultaneously modulated over the I and Q channels, respectively, of a QPSK modulator. Alternatively, first, second and third data streams may be independently modulated simultaneously over first, second and third modulation channels of an 8PSK modulator. The communication link with a first terminal may be limited to one modulation channel of the multi-dimensional modulator. Alternatively, the communication channel with the first terminal may be divided over more than one modulation channel of a multi-dimensional modulator, but limited to fewer than all of the channels of the multi-dimensional modulator.

According to yet a further alternative embodiment, the user terminals may include a decoder which automatically determines the modulation channels and encoding rate assigned to the terminal. The user terminal may include a demodulator that outputs multiple modulation channels, whereby a decoder is initially assigned to a first demodulation output channel. The decoder attempts to decode the first demodulation channel in order to establish a communications link between the satellite and the user terminal. If the user terminal is unable to establish a communications link over the first demodulation channel, a decoding processor switches to another demodulation channel and again attempts to demodulate the data stream. Alternatively, the user terminal may identify the demodulation channel assigned thereto and the decoder rate 1) based on predetermined information, 2) based on real-time command information received from the satellite, 3) based upon signal-to-noise ratio sampling, 4) based upon a bit error rate measurement and/or the like.

According to yet a further alternative embodiment, a ground station is provided with an encoder and modulator combination in which each input channel to the modulator includes an encoder having a different encoding rate. Optionally, one or more channels of the modulator may receive unencoded data, such as for user terminals having extremely strong signal connections with the satellite.

DETAILED DESCRIPTION OF THE INVENTION

Figure 1:
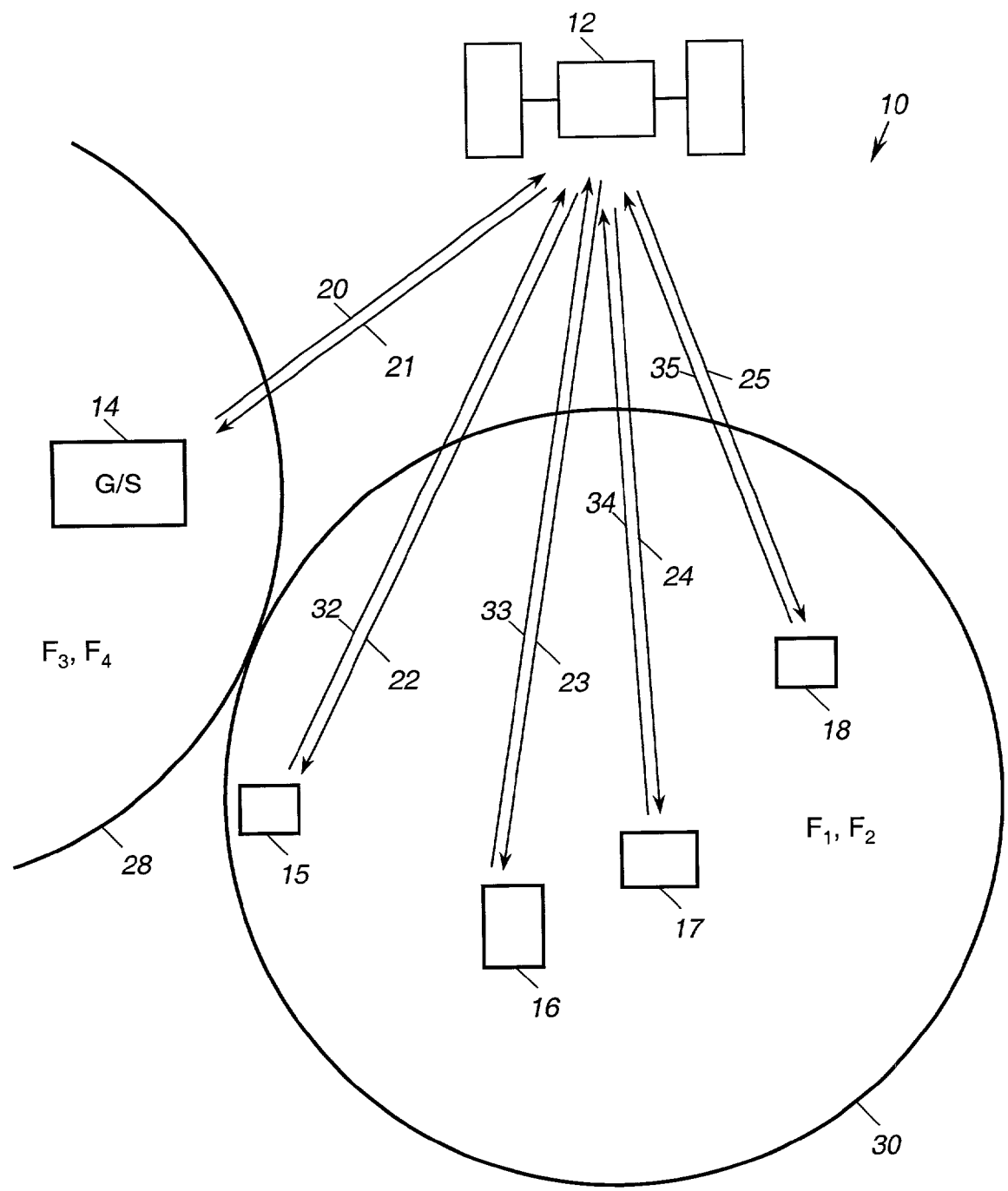
FIG. 1 illustrates a communications satellite system in accordance with a preferred embodiment of the present invention.

FIG. 1 illustrates a satellite communications system 10 including a satellite 12, a ground station 14 and multiple terminals 15–18. The ground station 14 communicates with the satellite 12 via an uplink 20 and a downlink 21. Terminals 15–18 similarly communicate with satellite 12 via uplinks 22–25 and downlinks 32–35. The satellite 12 includes an antenna array that defines a plurality of beam spots, each of which includes a coverage area. The ground station 14 is within the coverage area 28 of one beam spot, while terminals 15–18 are with the coverage area 30 of a second beam spot.

The satellite 12 maintains communications links between the ground station 14 and one or more of terminals 15–18. The uplink 20 from ground station 14 is defined by a frequency spectrum divided into frequency subbands, where each subband is associated with a unique beam. For instance, the first frequency subband within uplink 20 may correspond to coverage area 30 surrounding terminals 15–18. Terminals 15–18 may support communications channels carrying a variety of data types, such as audio data, video data, video conferencing data, broadcast video data, web surfing data and the like.

In the embodiment of FIG. 1, the satellite system 10 may implement a time division multiple access scheme, whereby the satellite 12 transmits at a single carrier frequency over the downlinks 22–25. Each of terminals 15–18 monitor the common carrier frequency and identify data packets therein addressed to the particular terminal based upon address information of each data packet and/or time slots assigned to each terminal 15–18. The terminals 15–18 may then transmit data packets to the satellite 12 over uplinks 32–35 also at a common frequency, but different from the carrier frequency of downlinks 22–25. The satellite 12 collects the incoming data packets over uplinks 32–35 and transmits a combined data signal over downlink 21 to the ground station 14.

In the foregoing manner, the terminals 15–18 maintain independent communications links with the ground station 14. Each independent communications link includes a communications data stream transmitted from the ground station 14, over uplink 20, through the satellite 12 to the downlinks 32–35. Similarly, each communications link from terminals 15–18 to ground station 14 includes a communications data stream passed over uplinks 32–35, through satellite 12 and via downlink 21 to the ground station 14.

The communications data streams transmitted over downlinks 22–25 are simultaneously modulated upon a common carrier frequency F1. The communications data streams transmitted over uplinks 32–35 are modulated over a common carrier frequency F2. The feeder uplink 20 includes a frequency subband F3 associated with the beam spot defining coverage area 30. The feeder downlink 21 includes a frequency subband F4 associated with the beam defining coverage area 30. The communications data streams passing to and from the terminals 15–18 are entirely independent of one another. For instance, terminal 15 may carry audio data, while terminal 17 may carry video conferencing data.

The coverage area 30 includes an uneven signal strength characteristic, whereby terminals located near the center of coverage area 30 experience a stronger signal connection with the satellite 12 than terminals located near the outer edge of coverage area 30 (e.g., terminal 15). For example, communications links between terminals 16 and 17 and ground station 14 in satellite 12 may experience a very strong signal connection with satellite 12, while terminal 18 may experience a slightly weaker signal connection and terminal 15 may experience an even weaker signal connection. As explained below in more detail, the communications links between terminals 16 and 17 and ground station 14 may be encoded at a lower encoding rate (e.g., three-fourths) than the encoding rate assigned to terminal 15 (e.g., one-half). The encoding rates assigned to each of terminals 15–18 differ based on the signal strength experienced by each terminal 15–18.

Figure 2:
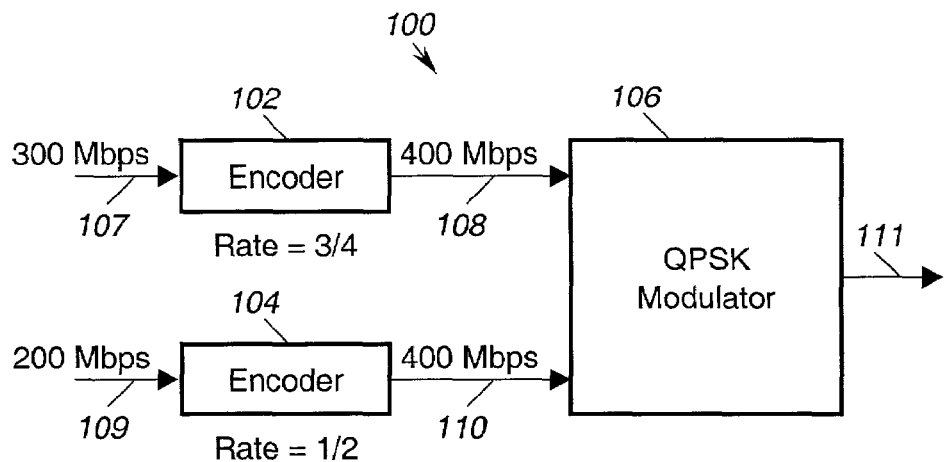
FIG. 2 illustrates an exemplary encoder and modulator combination used in accordance with a preferred embodiment of the present invention.

Turning to FIG. 2, an exemplary encoder and modulator combination 100 is illustrated. The encoder and modulator combination of FIG. 2 may be used in the ground station 14. Optionally, the satellite may perform processing and include the encoder and modulator combination 100. The encoder and modulator combination 100 includes first and second encoders 102 and 104 and a modulator 106. The encoder 102 is assigned to a three-fourths encoding rate, while the encoder 104 is assigned to a one-half encoding rate. Thus in the example of FIG. 2, when an input data rate of 300 Megabits per second (Mbps) is applied to encoder 102, an encoded data stream 108 is output at a rate of 400 Mbps. Similarly, when a data stream is provided on line 109 at a rate of 200 Mbps to encoder 104, an encoded data stream is output on line 110 at a rate of 400 Mbps. Lines 108 and 110 represent the I and Q input channels of a QPSK modulator 106. The QPSK modulator 106 modulates the incoming encoded data streams simultaneously and in parallel onto a carrier signal and outputs the resulting modulated signals on line 111.

When the encoder and modulator combination 100 of FIG. 2 is implemented in ground station 14, the line 107 may carry a data stream directed to terminal 17, while line 109 may carry a data stream directed to terminal 15. The data stream directed to terminal 17 is encoded with a rate three-fourths encoder 102 since terminal 17 is located near the center of coverage area 30 and thus experiences a stronger signal connection with satellite 12. A strong signal connection requires little encoding.

However, terminal 15 is located near the outer edge of coverage area 30 and thus experiences a weaker signal connection with satellite 12. Hence, the data stream carried on line 109 directed to terminal 15 is encoded with a rate one-half encoder 104. The data stream carried on line 107, after being encoded, is passed over the I channel of the QPSK modulator 106 to terminal 17. The data stream on line 109 is carried over the Q channel of the QPSK modulator 106 to terminal 15. The data streams on lines 107 and 109 are entirely independent of one another and have no relation to one another.

The terminals 15–18 each need only demodulate, decode, and process one channel in the modulated signal received from satellite 12. Terminal 17 need only demodulate, decode and process the I channel, while terminal 15 need only demodulate, decode and process the Q channel. Similarly, terminals 15 and 17 need only process encoded data received over the corresponding channel of the modulator. By providing separate downlink data streams for each dimension of the modulator (e.g., each of the I and Q channels of the QPSK modulator 106), the processing required by modulators 15–18 is simplified as each terminal 15–18 only need process the data stream carried over a single channel from a modulator. The modulator 106 simultaneously, and in parallel, modulates the independent communications data streams carried over lines 107 and 109 through the I and Q modulation channels associated with lines 108 and 110.

The present invention is not limited to the embodiment illustrated in FIG. 2. Instead, the preferred embodiments may be expanded to where the modulator represents an n-dimensional modulator. A QPSK modulator has two dimensions and thus may carry two independent data streams simultaneously and in parallel. An 8PSK modulator includes three dimensions and thus may carry up to three independent data streams simultaneously and in parallel. A 32-QAM modulator offers five dimensions and thus may carry up to five independent data streams simultaneously and in parallel. In a multi-dimensional modulator having three or more dimensions, a single data stream may be divided between more than one channel, but less than all of the channels. For instance, in an 8PSK modulator, a first data stream may be divided between the first and second channels, while a second data stream may be modulated over the third channel. In a 32-QAM modulator, first and second data streams may be modulated in parallel and simultaneously over the first and second channels, respectively, while a third single data stream may be divided between the remaining three channels of the 32-QAM.

Figure 3:
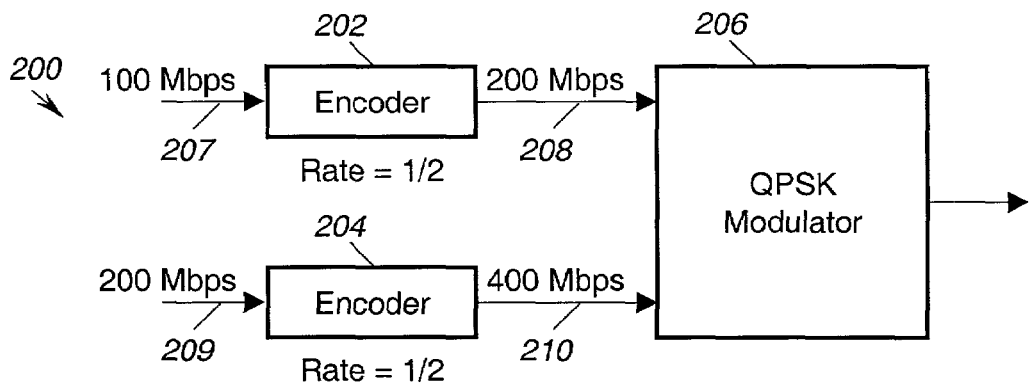
FIG. 3 illustrates an alternative encoder and modulator combination used in accordance with a preferred embodiment of the present invention.

FIG. 3 illustrates an alternative embodiment in which an encoder and modulator combination 200 includes an encoded 202 having a one-half encoding rate, an encoder 204 having a one-half encoder rate and a QPSK modulator 206. The encoder 202 may receive a first data stream over line 207 at a rate of 100 Mbps and output an encoded data stream over line 208 at a rate of 200 Mbps. The encoded data over line 208 is directed to the I channel of the QPSK modulator 206. The second encoder 204 includes an input line 209 which may carry an independent data stream at a rate of 200 Mbps. The encoder 204 will then output an encoder data rate of 400 Mbps over line 210. Line 210 corresponds to the Q channel of the QPSK modulator 206. In the example of FIG. 3, the data rates for the I and Q channels of the QPSK modulator 206 may differ without effective performance degradation since the data streams are entirely independent of one another and need not be transmitted at a common data rate or in synchronization with one another.

Figure 4:
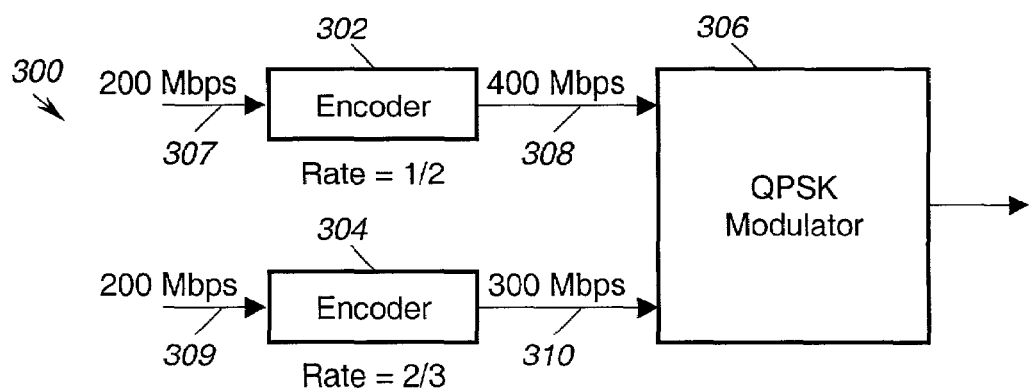
FIG. 4 illustrates an alternative embodiment for an encoder and modulator combination used in accordance with a preferred embodiment of the present invention.

FIG. 4 illustrates a further alternative embodiment for an encoder and modulator combination 300. The encoder and modulator combination 300 includes an encoder 302 having a one-half encoder rate, an encoder 304 having a two-thirds encoder rate and a QPSK modulator 306. The encoder 302 has an input line 307 receiving a data stream at a rate of 200 Mbps and outputting an encoded data stream over line 308 at a rate of 400 Mbps. The encoder 304 has an input line 309 which receives a data stream at a rate of 200 Mbps, while the encoder 304 outputs an encoded data stream over line 310 at a rate of 300 Mbps. The encoded data streams passed over line 308 and 310 are entirely independent of one another and provided over the I and Q channels, respectively of the QPSK modulator 306.

Figure 5:
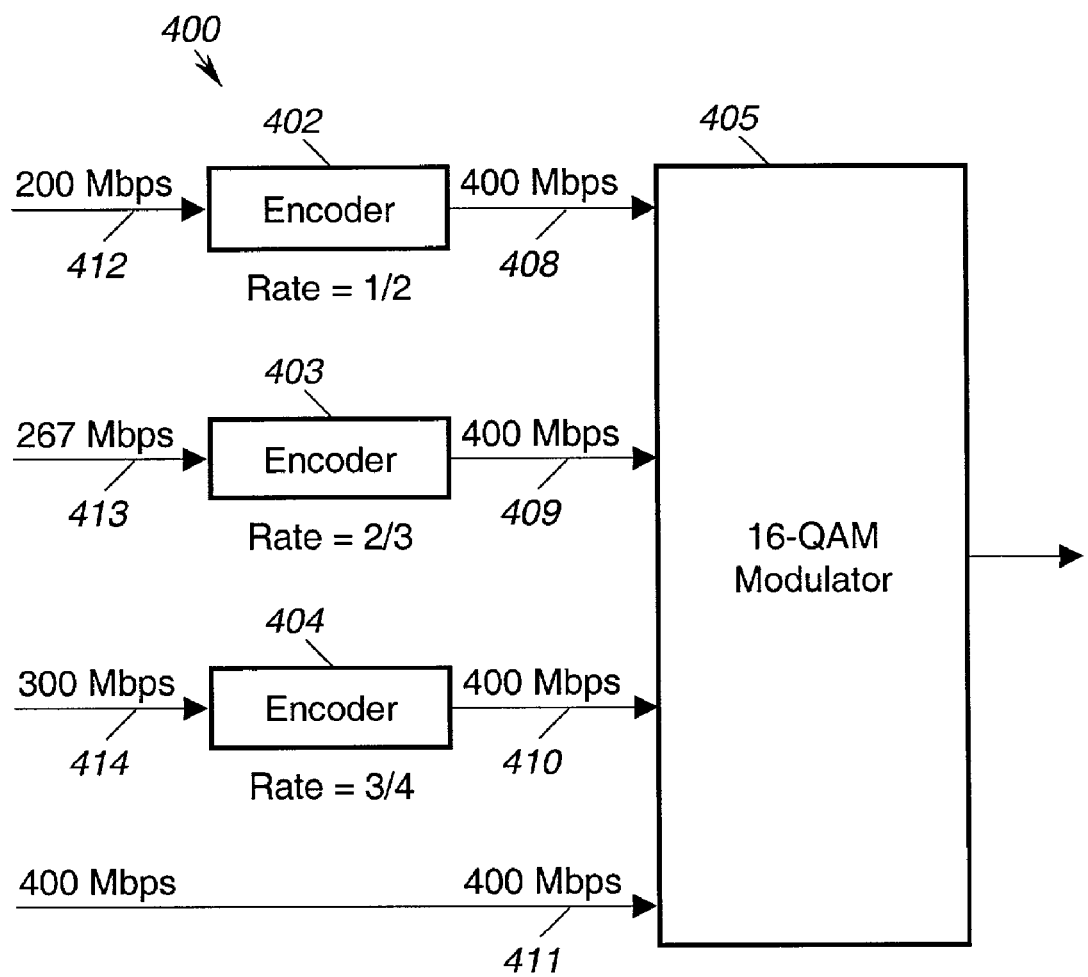
FIG. 5 illustrates an alternative embodiment for an encoder and modulator combination used in accordance with a preferred embodiment of the present invention.

FIG. 5 illustrates an alternative embodiment for an encoder modulator combination 400 having encoders 402, 403 and 404, and a 16-QAM modulator 406. The 16-QAM modulator 406 has four dimensions associated with four input lines 408–411. Encoders 402–404 have corresponding input lines 412–414. Encoders 402–404 have encoder rates of one-half, two-thirds and three-fourths, respectively. The fourth input line 411 of the 16-QAM modulator 406 has no encoder, since an encoder is not necessary for terminals having very strong connections with the satellite 12. Optionally, lines 408–411 of the modulator 406 may all transmit uncoded communications data, thereby removing encoders 402–404. The use of an encoder depends upon the signal strength achievable between the satellite and its user terminals. Hence no encoding may be necessary if a sufficiently strong signal strength is achieved. In the example of FIG. 5, input lines 412–414 have data rates of 200 Mbps, 267 Mbps and 300 Mbps. The fourth input line 411 has a data rate of 400 Mbps. The encoded data rates on lines 408–410 correspond to 400 Mbps. However, all of the inputs to the 16-QAM modulator 406 need not have the same data rate.

Figure 6:
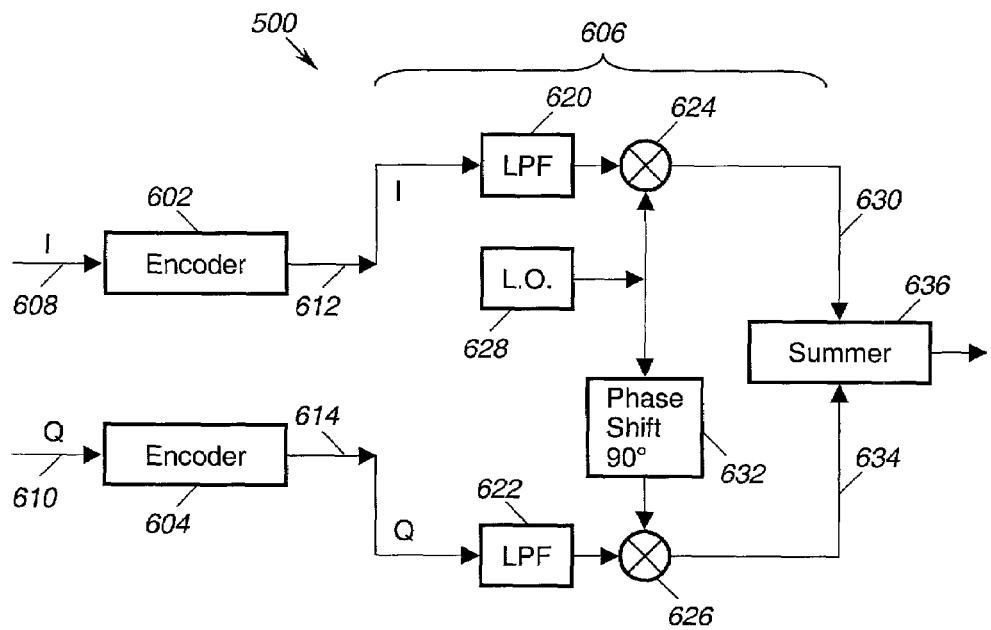
FIG. 6 illustrates a block diagram of an encoder and modulator combination used in accordance with an alternative embodiment of the present invention.

FIG. 6 illustrates a more detailed block diagram of an exemplary encoder and modulator combination 600. The encoder and modulator combination 600 of FIG. 6 includes two encoders 602 and 604, and a modulator 606. The encoders 602 and 604 include input lines 608 and 610 which receive independent data streams that are encoded and passed to lines 612 and 614 as encoded data streams. The encoded data stream on line 612 corresponds to the I channel of the modulator 606, while the encoded data stream on line 614 corresponds to the Q channel. The digital data passed from encoders 602 and 604 are provided to low pass filters 620 and 622 which provide pulse shaping. The outputs of the low pass filters 620 and 622 are passed to multipliers 624 and 626. A local oscillator 628 generates a baseband signal at a frequency corresponding to the carrier signal frequency. The output of the local oscillator 628 is multiplied at multiplier 624 with the encoded data upon the I channel and the product is passed on line 630. A phase shifter 632 converts the phase of the local oscillator 28 by a 90° phase shift. The output of the 90° phase shifter 632 is then multiplied at multiplier 626 by encoded data stream on the Q channel and the product is provided on line 634. The modulated signals on lines 630 and 634 are then combined by a summer 636 and ultimately output as a composite signal including parallel encoded communications data streams directed to different user terminals.

Figure 7:
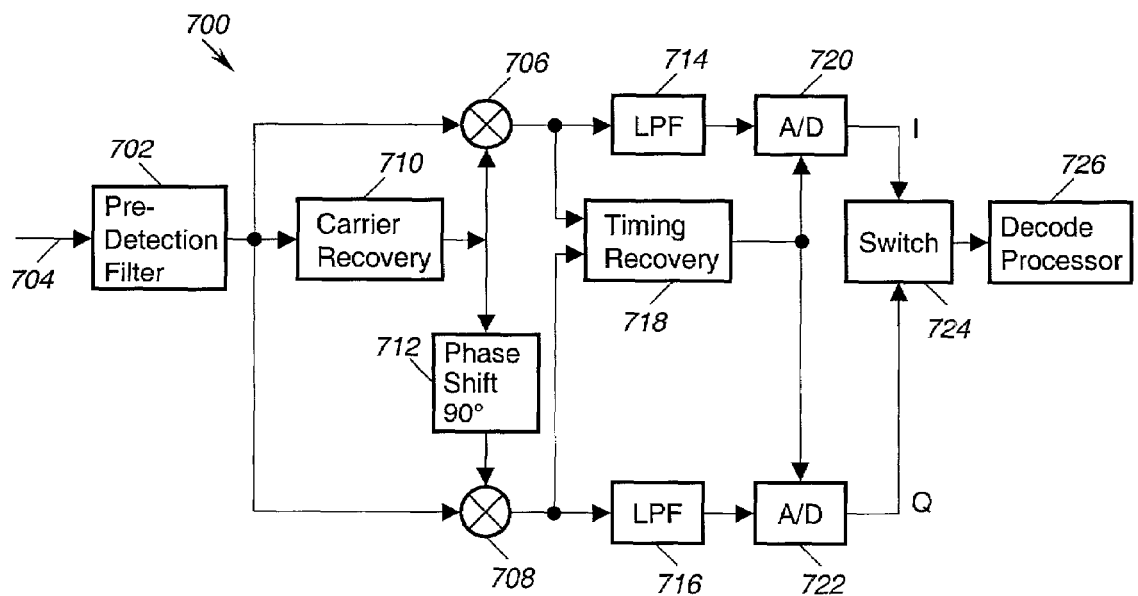
FIG. 7 illustrates a decoder and demodulator combination used in accordance with an alternative embodiment of the present invention.

Turning to FIG. 7, an exemplary demodulator 700 is illustrated. The demodulator 700 includes a predetection filter 702 which filters an incoming signal received on line 704 over one of downlinks 22–25 from the satellite 12. The output of the detection filter 702 is provided to multipliers 706 and 708 and to a carrier recovery module 710. The output of the carrier recovery module 710 outputs a carrier signal having a frequency equal to that of the downlinks 22–25. A phase shifter 712 shifts the phase of the carrier by 90°. The recovered carrier signal and phase shifted carrier signal are provided to the multipliers 706 and 708 and multiplied by the incoming signal. The outputs of multipliers 706 and 708 are provided to low pass filters 714 and 716 and to a timing recovery module 718. The timing recovery module 718 drives A/D converters 720 and 722 which convert the analog outputs of the low pass filter 714 and 716 to digital form. A switch 724 selects one of the I and Q channels for decoding by a processor 726 within the user terminal 15–18.

The data may include a PN sync sequence that the user would use to resolve I/Q ambiguities. The user would also be assigned to either the I or Q channel so it would know which channel to decode.

Optionally, the user terminal 15–18 may initially set switch 724 to a predetermined one of the I and Q channels and attempt to decode the data stream received over the chosen modulation channel. If the result of the decoding operation provides too many errors, the user terminal may determine that it has chosen the wrong channel and direct switch 724 to change to the other modulation channel. In the example of FIG. 1, user terminal 15 may initially be set to the Q channel in the encoder illustrated in FIG. 2. Encoder 104 in FIG. 2 offers a one-half encoder rate and thus is preferable for user terminals located near the edge of the coverage area 30. The user terminal 15 would preset the switch 724 to pass the demodulated data stream over the Q channel to a decoder where the encoded data stream is decoded at a one-half rate.

In addition, user terminal 17 may similarly be initially set to decode the data stream passed over the I channel of the demodulator 700. Since, the user terminal 17 is located near the center of the coverage area 30, terminal 17 may receive signals with sufficient strength to justify using a three-fourths encoder rate as offered by encoder 102. User terminal 17 would similarly attempt to decode data packets assigned to terminal 17 using a three-quarters rate encoder since a three-quarters rate encoder has been assigned to the I channel of the QPSK modulator 106.

In general, the user terminal 17 will know the channel to which it is assigned. The assignment may be predetermined based on location within a beam, in which case the assignment is static. Alternatively, the user terminal 17 may request a channel based on received signal strength, in which case the assignment is dynamic. For example, the user terminal 17 may request that its data be routed over the lightly coded channel in clear weather, and then request its data be routed over the heavy coded channel in rain.

In a burst communication system, the downlink may contain a PN sync sequence the user can use for synchronization. In this case, the user may select the I or Q channel, as appropriate.

In a continuous communication system, a PN sync sequence may not be utilized. In this case, the user may rely on the different coding rates on the I and Q channels to select the appropriate channel. If the user selects the incorrect channel where the encoder rate and the decoder rate do not match, there will be excessive decoder errors that will indicate the user should switch to a different channel.

Alternatively, a user terminal may identify a modulation channel assigned thereto based on an encoder rate assigned to the user terminal.

Figure 8:
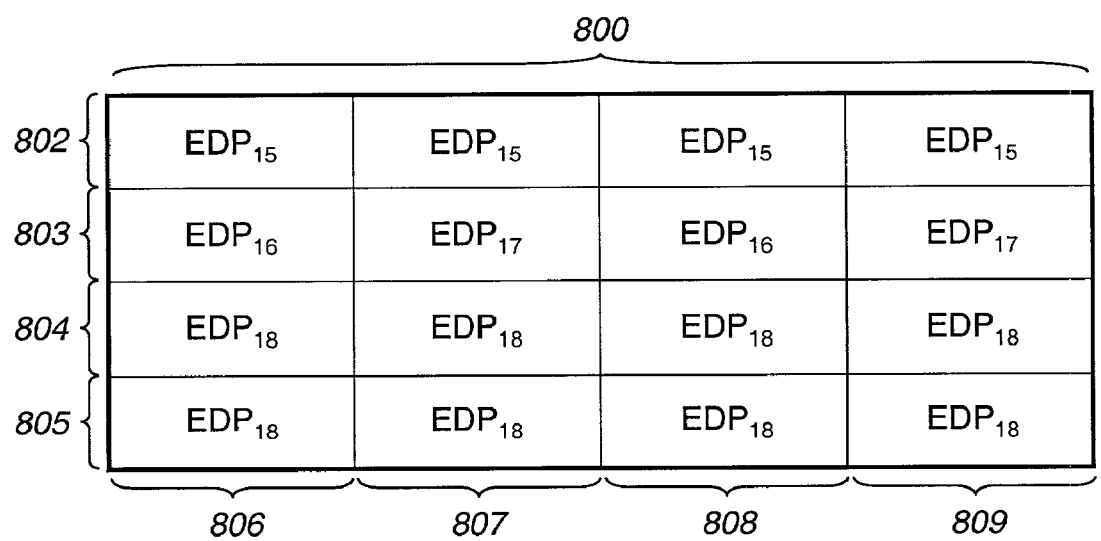
FIG. 8 illustrates an exemplary format for a master frame transmitted between a ground station and user terminal in accordance with an alternative embodiment of the present invention.

FIG. 8 illustrates an exemplary master frame 800 for a modulator having four dimensions. The master frame 800 includes modulation channels 802–805, such as in a 16-QAM modulator. The master frame is divided into time slots 806–809. In the example of FIG. 8, each of time slots 806–809 in each modulation channel 802–805 has been assigned to carry encoded data packets (EDP) directed to one of user terminals 15–18. In the example of FIG. 8, the first modulation channel 802 is dedicated to the user terminal 15 and thus every time slot in modulation channel 802 is assigned to an encoded data packet for user terminal 15 (EDP15). The modulation channel 803 is divided evenly between the user terminals 16 and 17 and thus alternate time slots include encoded data packets for user terminals 16 and 17 (EDP16 and EDP17). The user terminal 18 demands an even greater amount of bandwidth and thus two modulation channels 804 and 805 have been dedicated to user terminal 18.

Optionally, each user terminal may receive instructions in advance designating the modulation channel and encoder rate assigned to the user terminal. Alternatively, the user terminal may request such information from the satellite. As a further alternative, the user terminal may identify the modulation channel and decoder rate automatically by monitoring a signal-to-noise ratio of incoming signals, measuring a bit error rate of incoming signals, and the like. Based upon one or more measured parameters, the user terminal may choose from a set of channel and encoder rates predetermined for certain signal-to-noise ratios and/or bit error rates.

Alternatively, the satellite may be more intelligent than a bent-pipe type satellite. For instance, the satellite may perform on-board processing including, inter alia, decoding data, redirecting data to one of multiple destinations, directly interconnecting source and destination terminals and the like.

The preferred embodiments of the present invention provide for independent data streams to be carried in parallel and simultaneously over each modulation channel of a multi-dimensional modulator. Similarly, the preferred embodiments of the present invention enable each channel of a multi-channel modulator to be independently error correction coded with different formats to provide for different frame structures and qualities of service.

While particular elements, embodiments and applications of the present invention have been shown and described, it will be understood, that the invention is not limited thereto since modifications may be made by those skilled in the art, particularly in light of the foregoing teachings. It is, therefore, contemplated by the appended claims to cover such modifications as incorporate those features which come within the spirit and scope of the invention.

What is claimed is:

1. A method for providing communications data, in a satellite communications network, between user terminals and a ground station via a satellite, comprising:
   generating at least one carrier signal in a spot beam covering user terminals, said carrier signal conveying communications data over at least one downlink to the user terminals;
   modulating a single carrier signal simultaneously with first and second independent communications data streams over first and second modulation channels, respectively, of a multi-dimensional modulator; and
   assigning said first and second communications data streams to first and second terminals, respectively, based on a signal strength of downlinks to said terminals.

2. The method of claim 1, wherein the assigning step comprises:
   assigning said first communications data stream to a first terminal located near an edge of the beam spot; and
   assigning said second communications data stream to a second terminal located near a center of the beam spot.

3. A method for providing communications data, in a satellite communications network, between user terminals and a ground station via a satellite, comprising:
   generating at least one carrier signal in a spot beam covering, user terminals, said carrier signal conveying communications data over at least one downlink to the user terminals;
   modulating a single carrier signal simultaneously with first and second independent communications data streams over first and second modulation channels, respectively, of a multi-dimensional modulator; and
   before modulation, encoding said first and second communications data streams based upon different encoder rates.

4. A method for providing communications data, in a satellite communications network, between user terminals and a ground station via a satellite, comprising:
   generating at least one carrier signal in a spot beam covering user terminals, said carrier signal conveying communications data over at least one downlink to the user terminals;
   modulating a single carrier signal simultaneously with first and second independent communications data streams over first and second modulation channels, respectively, of a multi-dimensional modulator; and
   modulating simultaneously the first and second communications data streams over the I and Q channels, respectively of a QPSK modulator.

5. A method for providing communications data, in a satellite communications network, between user terminals and a ground station via a satellite, comprising:
   generating at least one carrier signal in a spot beam covering user terminals, said carrier signal conveying communications data over at least one downlink to the user terminals; and
   modulating a single carrier signal simultaneously with first and second independent communications data streams over first and second modulation channels, respectively, of a multi-dimensional modulator comprising:
   modulating the first communications data stream over first and second modulation channels of a QAM modulator; and
   simultaneously modulating the second communications data stream over a third modulator channel of the QAM modulator.

6. The method of claim 5, further comprising:
   simultaneously establishing first and second communications links with first and second user terminals, respectively, through said first and second modulation channels.

7. The method of claim 5, further comprising:
   limiting an entire communications link with a first terminal to one channel of said multi-dimensional modulator.

8. A method for providing communications data, in a satellite communications network, between user terminals and a ground station via a satellite, comprising:
   generating at least one carrier signal in a spot beam covering user terminals, said carrier signal conveying communications data over at least one downlink to the user terminals;
   modulating a single carrier signal simultaneously with first and second independent communications data streams over first and second modulation channels, respectively, of a multi-dimensional modulator;
   attempting to establish a communications link between the satellite and a user terminal over the first modulation channel of the multi-dimensional modulator;
   determining that the first modulation channel is not carrying, data directed to the user terminal; and
   switching to another modulation channel of the multi-dimensional modulator, after the determining step and again attempting to establish a communications link.

9. A satellite system comprising:
   multiple terminals;
   a satellite generating a beam, said beam defining a coverage area of said beam, said satellite using a common carrier signal to transmit data to multiple terminals located in said beam; and
   a ground station including a multi-dimensional modulator having at least two input channels receiving first and second separate data streams associated with independent communications links with first and second terminals, respectively, the modulator assigning the first and second data streams to first and second dimensions, respectively, of a multi-dimensional modulator;
   said modulator assigning said first communications data stream to a first terminal located near an edge of said coverage area of said beam; and
   said modulator assigning said second communications data stream to a second terminal located near a center of the coverage area of the beam.

10. A satellite system comprising:
   multiple terminals;
   a satellite generating a beam, said beam defining a coverage area of said beam, said satellite using a common carrier signal to transmit data to multiple terminals located in said beam; and
   a ground station including a multi-dimensional modulator having at least two input channels receiving first and second separate data streams associated with independent communications links with first and second terminals, respectively, the modulator assigning the first and second data streams to first and second dimensions, respectively, of a multi-dimensional modulator,
   said modulator simultaneously modulating said first and second communications data streams over I and Q modulation channels, respectively, of a QPSK modulator.

11. A satellite system comprising:
multiple terminals;
a satellite generating a beam, said beam defining a coverage area of said beam, said satellite using a common carrier signal to transmit data to multiple terminals located in said beam;
a ground station including a multi-dimensional modulator having at least two input channels receiving first and second separate data streams associated with independent communications links with first and second terminals, respectively, the modulator assigning the first and second data streams to first and second dimensions, respectively, of a multi-dimensional modulator;
a QAM modulator having first and second modulation channels receiving said first communications data stream and having a third modulation channel receiving said second communications data stream, said QAM modulator simultaneously modulating said first and second communications data streams over corresponding modulation channels.

12. The system of claim 11, further comprising:
first and second user terminals simultaneously establishing first and second communications links, respectively, with said ground station through, said first and second modulation channels.

13. The system of claim 11 wherein said modulator limits an entire communications link with a first terminal to one channel of said multi-dimensional modulator.

14. The system of claim 11, wherein said modulator limits an entire communications link with a first terminal to fewer than all channels of said multi-dimensional modulator.

15. A satellite system comprising:
multiple terminals;
a satellite generating a beam, said beam defining a coverage area of said beam, said satellite using a common carrier signal to transmit data, to multiple terminals located in said beam; and
a ground station including a multi-dimensional modulator having at least two input channels receiving first and second separate data streams associated with independent communications links with first and second terminals, respectively, the modulator assigning the first and second data streams to first and second dimensions, respectively, of a multi-dimensional modulator;
at least one of said multiple terminals comprising:
a processor, at a terminal, attempting to establish a communications link between said terminal and satellite over a first modulation channel defined by the multi-dimensional modulator, said processor determining that the first modulation channel is not carrying data directed to said terminal; and
a switch controlled by the processor to switch to another modulation channel after determining that the first modulation channel was incorrect.

16. A communication data signal embodied in a carrier wave of a downlink from a communications satellite, comprising:
first and second independent communications data streams modulated, simultaneously and in parallel, onto respective first and second modulation channels defined in accordance with a multi-dimensional modulation technique, said first and second communications date streams carrying independent and unrelated data; and
encoded communications data in at least one of said first and second communications data streams.

17. The communications data signal of claim 16, wherein said first and second independent communications data streams are modulated onto the I and Q channels, respectively of a QPSK modulation technique.

18. The communications data signal of claim 16, further comprising:
first, second and third independent communications data streams directed to first, second and third user terminals, modulated onto first, second and third modulation channels of a 16-QAM modulation technique.

* * * * *